United States Patent
Goerg

(10) Patent No.: US 10,737,388 B2
(45) Date of Patent: Aug. 11, 2020

(54) HRC SYSTEM AND METHOD FOR CONTROLLING AN HRC SYSTEM

(71) Applicant: KUKA Systems GmbH, Augsburg (DE)

(72) Inventor: Patrick Goerg, Gachenbach-Sattelberg (DE)

(73) Assignee: KUKA Systems GmbH, Augsburg (DE)

( * ) Notice: Subject to any disclaimer, the term of this patent is extended or adjusted under 35 U.S.C. 154(b) by 344 days.

(21) Appl. No.: 15/769,926

(22) PCT Filed: Oct. 20, 2016

(86) PCT No.: PCT/EP2016/001735
§ 371 (c)(1),
(2) Date: Apr. 20, 2018

(87) PCT Pub. No.: WO2017/067661
PCT Pub. Date: Apr. 27, 2017

(65) Prior Publication Data
US 2019/0084157 A1 Mar. 21, 2019

(30) Foreign Application Priority Data
Oct. 21, 2015 (DE) .......... 10 2015 220 517

(51) Int. Cl.
*G06F 19/00* (2018.01)
*B25J 9/16* (2006.01)

(52) U.S. Cl.
CPC .......... *B25J 9/1674* (2013.01); *B25J 9/1612* (2013.01); *B25J 9/1633* (2013.01); *B25J 9/1697* (2013.01);
(Continued)

(58) Field of Classification Search
CPC ...... B25J 9/1674; B25J 9/1633; B25J 9/1697; B25J 9/1612; G05B 2219/42318;
(Continued)

(56) References Cited

U.S. PATENT DOCUMENTS

2011/0295399 A1 12/2011 Plociennik et al.
2013/0266205 A1 10/2013 Valpola
(Continued)

FOREIGN PATENT DOCUMENTS

DE 102013113044 A1 6/2014
EP 2073084 A1 6/2009
(Continued)

OTHER PUBLICATIONS

European Patent Office; Search Report in International Patent Application No. PCT/EP2016/001735 dated Jan. 20, 2017; 6 pages.

*Primary Examiner* — Ian Jen
(74) *Attorney, Agent, or Firm* — Dorton & Willis, LLP

(57) ABSTRACT

A method for controlling a human-robot collaboration (HRC) system wherein the HRC system includes at least one manipulator having an end effector. The method includes using the end effector in a first operating mode, wherein the end effector is operated with reduced power; monitoring whether a desired object is manipulated when the end effector is used in the first operating mode; and increasing the power used to operate the end effector in order to use the end effector in a second operating mode when the monitoring indicates that the desired object is being manipulated.

21 Claims, 5 Drawing Sheets

(52) U.S. Cl.
CPC .............. *G05B 2219/40198* (2013.01); *G05B 2219/40202* (2013.01); *G05B 2219/40577* (2013.01); *G05B 2219/40607* (2013.01); *G05B 2219/42318* (2013.01)

(58) Field of Classification Search
CPC ........... G05B 2219/40198; G05B 2219/40577; G05B 2219/40607; G05B 2219/40202
See application file for complete search history.

(56) References Cited

U.S. PATENT DOCUMENTS

| | | | |
|---|---|---|---|
| 2014/0156066 A1* | 6/2014 | Sakano | ................... B25J 9/1633 700/245 |
| 2017/0214717 A1* | 7/2017 | Bush | ................... G05B 19/0426 |
| 2018/0107198 A1* | 4/2018 | Linder | ...................... B25F 5/00 |

FOREIGN PATENT DOCUMENTS

| | | | | |
|---|---|---|---|---|
| EP | 2073084 B1 * | 2/2013 | ............. | G05B 19/19 |
| WO | 2012080130 A1 | 6/2012 | | |

\* cited by examiner

HRC SYSTEM AND METHOD FOR CONTROLLING AN HRC SYSTEM

CROSS-REFERENCE

This application is a national phase application under 35 U.S.C. § 371 of International Patent Application No. PCT/EP2016/001735, filed Oct. 20, 2016 (pending), which claims the benefit of German Patent Application No. DE 10 2015 220 517.7, filed Oct. 21, 2015, the disclosures of which are incorporated by reference herein in their entirety.

TECHNICAL FIELD

The invention relates to a human-robot collaboration system (HRC system) and a method for controlling an HRC system, wherein said HRC system comprises at least one manipulator comprising an end effector, and wherein by means of the method the energy, made available to the end effector, can be increased without exposing humans to risks.

BACKGROUND

Human-robot collaboration systems (HRC systems) enable the collaboration between humans and manipulators/robots through the use of modern safety technology.

A manipulator of an HRC system is a device, which enables the physical interaction with the environment. In HRC systems, in particular, industrial robots are used, which are automatically guided, multipurpose manipulators equipped with three or more freely programmable axes of motion. Industrial robots are used in either a fixed or mobile manner in industrial applications and bear, for example, end effectors or workpieces. The end effector is the last link of the kinematic chain of the industrial robot and may be, for example, a gripper.

In HRC systems the high output of a manipulator can be combined, for example, with the sensory abilities of humans. Possible applications are, for example, in industrial production, such as in the production of cars. Typical applications are lifting and mounting apparatuses, in which a workpiece is lifted by the manipulator and then positioned by a human. In addition to the resulting potential for rationalization, such applications are advantageous because, for example, the ergonomics of a workplace and/or endurance of a human can be increased.

HRC systems require that the human, collaborating with the manipulator, be not endangered by the manipulator. In particular, the objective is to achieve a machine safety category 3 in accordance with ISO 13849 in HRC systems. In this case an HRC system is considered safe. In order to eliminate a risk to the human, the forces, applied by the manipulator to a workpiece, are often reduced to the extent that no injuries or no serious injuries to a human may occur. In particular, the gripping force of grippers is reduced to such an extent that a human cannot be injured by a grasping of the manipulator. This, however, drastically restricts the range of application. To be able to apply, nevertheless, high forces to a workpiece, extensive safety measures or design measures are necessary.

Design measures to prevent a person or a body part from being, for example, pinched or crushed, often restrict the range of use of a manipulator, because additional safety components are attached, or the working area of the manipulator is restricted. Safety measures comprise, for example, a safe closed-loop position and/or force control of the end effector, thus, increasing the complexity of the calculations. In particular, there is frequent switching between the position and force-controlled mode, as a result of which the control requirements are very high.

The object of the present invention is to eliminate the aforementioned disadvantages at least partially and to provide a corresponding HRC system and a method for controlling an HRC system.

SUMMARY

The object is achieved by a method for controlling a human-robot collaboration system (HRC system), wherein the HRC system comprises at least one manipulator comprising an end effector, and wherein the method comprises the steps of using, in the sense of applying, the end effector in a first operating mode, wherein the end effector is operated in the first operating mode with reduced power; monitoring, whether a desired object is being manipulated, when the end effector is used in the first operating mode; and increasing the power, with which the end effector is operated, in order to use the end effector in a second operating mode, when the monitoring has indicated that a desired object is being manipulated.

In the first operating mode the end effector is operated with reduced power, so that a reduced power is available for manipulating and/or processing an object/a workpiece. Preferably a constant amount of energy is always made available to the end effector. This energy may be, for example, a compressed air supply or an electric current. A control element, such as, for example, a throttle or a current regulator, reduces the amount of energy available for manipulating and/or processing an object/a workpiece, so that the end effector is operated with reduced power.

The power, with which the end effector is operated in the first operating mode, is selected preferably in such a way that any possibility of a hazard to humans is precluded. When switching from the first to a second operating mode, a possibility of exposing a human to a hazard has to be precluded, because the HRC system is to be operated in the second operating mode without limiting, for example, the gripping force. This is possible, since before switching to the second, potentially hazardous, operating mode a monitoring take place that detects whether a desired object is being manipulated, and, in this way, precludes any possibility of a risk to a human. The risk to the human can be precluded, when the monitoring has indicated that only a desired object is being manipulated. Manipulating by means of the end effector may include, inter alia, gripping, processing, measuring and/or transporting an object.

The end effector may be, for example, a gripper, a screwdriver, a welding tool or any other tool for processing, transporting, measuring and grasping an object, wherein the object is preferably a workpiece. In the following non-restrictive example, the end effector is a gripper. When this gripper is used in a first operating state, i.e., the gripper is operated with reduced power, the gripping force of the gripper is reduced, compared to the second operating state, in which the power of the gripper is increased. Preferably the power in the first operating state is reduced in such a way that the resulting gripping force cannot endanger a person. Analogously, the power in a first operating state can be reduced for any type of end effector. For example, in the case of a screwdriver the reduced power results in the torque being limited; and in the case of a welding tool, the temperature being limited. In general, the reduced power, with which an end effector is operated, causes different effects in different end effectors. These effects may be to limit the force, the torque, the temperature, the speed, the acceleration and/or the like. Preferably the reduced power is selected in such a way that the use of the end effector in the first operating state does not result in a hazard to a human. Monitoring, whether a person is at risk when the end effector is used, ensures that the system can be switched subsequently/later into a second operating mode, without exposing a human to risks, since it has been preferably ensured that a desired object is being manipulated, preferably is being/will be gripped.

In order to stay in the above example, the monitoring can preclude that a human or a body part of a human is in the gripping area of a gripper, in the welding area of a welding tool or, in general, in the area of use of an end effector, when it has been detected that a desired object is being manipulated.

The monitoring, whether a desired object is being manipulated, is carried out preferably by a safe sensor system, so that it can be safely determined that a desired object is being manipulated. When a desired object is being manipulated, the HRC system can increase the power, with which the end effector is operated, so that the end effector can be used without limiting the power. For example, the gripping force, exerted on an object/a workpiece, can be increased by the increased power. Similarly the temperature can be increased until, for example, welding is possible. In this way it is ensured in the first operating mode that, for example, when a gripper is closed, no human can be at risk or can be injured, but then in the second operating mode sufficient force is present or provided as soon as the object has been grasped, in order to move said object without it, for example, falling out of the gripper. In particular, in order to switch to the second operating state, the position of the end effector and/or the parts of the end effector does not have to be changed. When, for example, an object is gripped in the first operating state, it is possible to switch (with increased gripping force) to the second operating state, without having to open and/or reposition the gripper. Thus, a human cannot be exposed to a risk even when switching over, since, for example, no body part or perhaps clothing can be introduced between the object and the gripper.

Thus, the HRC system can be used without constraints, so that the range of application is wider than in the case of conventional HRC systems. Moreover, the method described is simpler than the safe closed-loop control methods known from the prior art.

Preferably the power, with which the end effector is operated in the first operating mode, is limited by an upper threshold value, wherein the compliance with the upper threshold value is monitored and/or ensured. Preferably the upper threshold value defines a current, a pressure, a force or a torque and is set preferably in such a way that no human is or can be at risk in the first operating mode. In particular, the upper threshold value does not have to be defined in the same physical quantity as the power, with which the end effector is operated. End effectors typically convert a supplied form of energy into another. Grippers convert, for example, electric current and/or pneumatic pressure into gripping force. Therefore, the upper threshold value can be defined in the same physical quantity as the power, with which the end effector is operated, or in the converted physical quantity.

Therefore, it is possible to define the first operating mode by specifying a maximum force, although the end effector is supplied, for example, with energy in the form of electric current. Similarly the definition of the upper threshold value is possible for the supply of pressure in hydraulic and/or pneumatic drives, as well as for the supply of force or torque in mechanical systems.

Preferably this upper threshold value of the first operating mode is selected in such a way that no human is or can be at risk. The upper threshold values may vary as a function of the design and the application of the end effector. If, for example, a welding electrode is operated and, in so doing, the welding electrode heats up, then the upper threshold value depends, for example, on the shielding of the welding electrode. If no shielding is provided, it may be necessary to select the upper threshold value in such a way that the maximum temperature of the welding electrode is limited, for example, to 60 degrees Celsius. If, however, shielding to protect humans is provided, then correspondingly higher temperatures can be permitted. This also applies mutatis mutandis to the limiting of other forms of power. A human is always at risk, when an injury can be expected.

Preferably the monitoring, whether a desired object is being manipulated, is carried out safely and preferably by means of at least two sensors. A redundant and, therefore, safe monitoring is facilitated preferably by monitoring with at least two sensors. In this case "safe" means preferably that values, forces, torques and/or other things are determined over two channels and, thus, in a redundant manner and/or are transmitted to the controller and/or are/will be evaluated there. More preferably, the sensors may be redundant sensors. Safe monitoring helps to avoid errors in the HRC system and/or errors in monitoring, so that faulty sensor signals can be avoided and/or detected. This can be done, for example, through the use of two sensors, which detect preferably the same or identical event to be measured or the same or identical change to be measured. For example, sensors are used to determine whether the desired object is being or has been manipulated, and more preferably, whether the desired component is being or has been grasped. If both sensors report that a desired object is being safely manipulated, then it may be assumed that no faulty sensor signal is present. Similarly the sensors can report reliably that a certain object/workpiece is being grasped, processed, measured or transported. Furthermore, preference is given to the use of sensors, which directly preclude the possibility of hazards to a human. These sensors are preferably thermal sensors, such as, for example, thermal imaging cameras, by means of which it can be determined that no human and/or no body part is located in a potentially dangerous area, such as the working area of the end effector.

Preferably the monitoring, whether a desired object is being manipulated, is carried out by at least one capacitive, inductive, resistive and/or thermal sensor, which is arranged preferably on the end effector. Other sensors, such as a pyroelectric, thermoelectric, piezoelectric, photoelectric, magneto-electric sensor and/or a sensor for detecting the formation of electrochemical potentials at interface layers, the change in the output work at phase boundaries, ion conductivity of electrolytes, hygroscopic properties and mechanical variables, such as surface pressure and Coriolis force, may also be used to monitor, whether a desired object is being manipulated. Such sensors can distinguish, for example, between typical object-materials, such as plastic, ceramic or metal, and skin, hair and/or clothes of a human. If these sensors are arranged on the end effector, then it can be clearly distinguished whether the manipulated object is a human or an object/a workpiece. Consequently potential hazards to a human can be detected and avoided.

Preferably the monitoring, whether a desired object is being manipulated, is carried out by at least one optical and/or acoustic sensor, where the optical and/or acoustic sensor may be used to detect whether an object and/or which object is being manipulated when the end effector is used. Such optical and/or acoustic sensors may be, for example, cameras, laser-based sensors or ultrasound-based sensors. These sensors are typically arranged next to or on the end effector, or they may be disposed at another suitable location so as to be either stationary or mobile. In particular, acoustic and/or optical sensors are suitable for detecting certain objects, such as workpieces. By appropriate signal conditioning it is possible to distinguish between objects (workpieces) and humans. Optical and/or acoustic sensors can be used in a variety of ways and can be easily adapted to varying applications. In particular, the system can be taught new objects without having to modify the hardware.

Preferably the monitoring, whether a desired object is being manipulated, is carried out by means of at least two different sensors. The use of different sensors, i.e., the benefits of different detection methods, such as position sensing, capacitive, inductive and recessive and/or thermal sensors and/or acoustic and/or optical sensors, makes it possible to determine reliably whether a desired object is being manipulated. In particular, different physical properties can be monitored by using different sensors. This leads to a higher probability of detection of a desired object to be manipulated and, thus, to a higher probability of detection of a risk to a human. Furthermore, the use of different sensors allows monitoring under varying environmental conditions, so that the failure of the sensor system and/or faulty sensor signals can be prevented and/or the probability of their occurrence can be at least reduced.

Preferably the monitoring, whether a desired object is being manipulated, is carried out time-dependent and/or location-dependent in the first operating mode. If, for example, an object is to be grasped by means of an end effector, then the period of time that is needed to perform the grasping operation is typically known. If the end effector is used in the first operating mode, then the power, with which the end effector is operated, is reduced; and the reduced power precludes the possibility of a hazard to a human. Once the period of time required to execute the gripping operation has lapsed, the monitoring, whether the desired object is being manipulated, is carried out. If this is the case, then the power can be increased in the second operating mode, in order to grip the object with the required high power.

Preferably the end effector is driven by at least one electric motor, wherein the upper threshold value defines a maximum motor current, and wherein the motor current of at least one electric motor is monitored and is compared with an upper threshold value, wherein the monitoring is carried out preferably in a redundant manner. Preferably it is also only possible to ensure that the motor current of the at least one electric motor may not exceed an upper threshold value. In this case, in particular, the ensuring may be carried out in a redundant manner.

This leads to a reduction in the complexity of the monitoring. If, for example, an object is to be gripped with an electrically driven end effector (gripper), then the motor current of the gripper or the motor current of the motors, which generate the gripping movement, is monitored for compliance with the upper threshold value in the first operating mode. Preferably it is ensured that the gripper and/or the motors, which generate the gripping movement, are provided with only a (motor) current that does not exceed the upper threshold value. If the motor current increases, then it is recognized that the end effector has already made light contact with the object; and a gripping force is applied to the object. If an upper threshold value is defined, then the grasping can be interrupted, when a gripping force, corresponding to the threshold value, is applied to an object. The threshold value can be determined in the form of a motor current. Similarly appropriate sensors can be attached to the end effector; and these sensors allow, for example, the gripping force to be determined (for example, a load cell, strain gauges or the like). Before switching to the second operating mode, in which the threshold value is exceeded, i.e., the energy, supplied to the end effector, is increased, it is checked whether the gripped or manipulated object is positively not a human. If no human has been grasped, then it is possible to switch to the second operating mode; and the gripping force can be increased. Consequently, the checking, whether a desired object is being manipulated or gripped, or whether a human is at risk, does not have to be performed continuously, but rather only before changing to the second operating mode, or before exceeding the upper threshold value of the first operating mode.

Preferably the motor current is controlled by at least one regulator, wherein the closed-loop control takes place preferably in a non-safe manner. The closed-loop control of the motor current can be carried out in the above example in a non-safe manner, when the upper threshold value is selected in such a way that any risk to a human is precluded by the end effector in the first operating mode. That means that it can be safely detected that a desired object to be manipulated is present and/or is being or will be manipulated. In that case it just has to be monitored in a safe way that the upper threshold value is met or cannot be exceeded. As an alternative, it is possible to carry out a redundant, safe closed-loop control and to monitor whether the regulators that are used deliver the same control outputs, according to which the closed-loop control is to be regarded as safe. However, in particular, the non-safe closed-loop control makes it possible to reduce the control complexity by using only one regulator and to save resources and computing power. This embodiment relates to the use of two regulators. Generally, a closed-loop control is considered to be safe, if a redundant determination of data/values or the like is carried out, for example, when a force, applied by a gripper to an object, is determined by two different sensors. Accordingly, preferably a non-safe system or a non-safe closed-loop control exists, if only one of the types of data or measured values or the like is detected, and no redundant determination is present.

Preferably the end effector is operated electrically, hydraulically and/or pneumatically. In particular, operating with hydraulic and/or pneumatic pressure is widely used in gripper applications, since the end effector need only be provided with pressure hoses. Thus, only a few built-on accessories have to be added to the manipulator. However, electric drives have the advantage that they can be used in a variety of ways and can provide, for example, a variably adjustable gripping force or a controlled torque.

Preferably the method also comprises a method step, according to which the energy, supplied to the end effector, is switched off, when the monitoring has indicated that a human is at risk and/or no desired object is being manipulated. Thus, it can be ensured that when a risk to a human is detected, said risk does not cause injury to the human. By means of the energy, supplied to the end effector, the end effector is operated with a reduced and/or increased power, so that a reduced/increased power is available for manipulating and/or processing an object/a workpiece.

Preferably the end effector is a gripper that grasps an object with a reduced gripping force in the first operating mode, wherein the gripper grasps an object in the second operating mode with an increased gripping force, when the monitoring has indicated that a desired object is being manipulated. Thus, for example, an object to be grasped can be initially touched with a reduced gripping force. If it is detected that a desired object is being manipulated/grasped, i.e., no human is at risk, then the gripping force can be increased and the gripper can be operated without having to limit the gripping force. Thus, when switching from the first to the second operating mode, the gripper does not have to be opened again, but rather can remain in the position of the first operating mode, so that a part of the body and/or clothing cannot be introduced between the object and the gripper. The maximum gripping force is defined preferably only by the gripper that is used and the sensitivity of the object to be grasped. Thus, diverse applications are conceivable. For example, the load capacity of the HRC system during transport of objects is limited only by the maximum load capacity of the manipulator that is used. Furthermore, there is no need for structural measures, such as end stops or the like, to preclude the risk to a human (it goes without saying that such structural measures could also be provided). Thus, the working range of the HRC system is not restricted.

Preferably the gripper comprises at least two gripping elements, wherein the monitoring, whether a desired object is being manipulated, is carried out by monitoring the positioning of the gripping elements to one another. Monitoring the positioning of the gripping elements simplifies the monitoring, since, for example, the distance between the gripping elements when gripping a desired object to be manipulated is known. If the distance between the gripping elements is reached in the first operating state, then the object is gripped with a reduced gripping force, which corresponds to the reduced power. Subsequently it can be checked in the preferably stationary position of the manipulator whether the desired component has been gripped. It is particularly preferred that a first sensor for monitoring may be a position sensor. A sensor per se does not have to be provided explicitly as a position sensor, but rather any element that can determine or detect the position of the gripping elements, where said position is determined preferably as the position of the gripping elements with respect to each other, is to be regarded as a corresponding sensor. Then it is possible to switch to the second operating state, and the power, with which the end effector is operated (i.e., the gripping force), can be increased.

The distance between the gripping elements, when grasping a desired object to be manipulated, is selected preferably in such a way that that no human and no part of a human may be introduced between the gripper and the object. Similarly the monitoring of the position can be implemented for other end effectors.

Furthermore, the object of the invention is achieved by an HRC system comprising at least one manipulator, on which an end effector is disposed. Furthermore, a control unit of the HRC system is configured to use the end effector in a first operating mode, wherein the end effector is operated in the first operating mode with reduced power. A sensor that is configured to monitor, whether a desired object is being manipulated, when the end effector is used, and a control element that is configured to increase the power, with which the end effector is operated, in order to use the end effector in a second operating mode, when the monitoring has indicated that a desired workpiece is being manipulated, are also comprised by the HRC system.

Such HRC systems are suitable for carrying out the method described above and for achieving the advantages described. The control element, which is configured to increase the power, with which the end effector is operated, may comprise, for example, an additional source of energy that is engaged in the second operating mode. When electric energy is supplied, the control element may comprise a switch, which switches between the reduced power of the first operating mode and the increased power of the second operating mode. If the end effector is to be used with hydraulic and/or pneumatic pressure, then the control element may comprise, for example, an adjustable throttle. By means of this throttle the end effector can be operated in the first operating mode with a reduced pressure; and in a second operating mode the pressure (i.e., the amount of air) can be increased. Additional control elements to increase the power can also be provided.

Preferably the control unit is configured for evaluating the sensors. A central evaluation of the sensors in the control unit is advantageous, because no additional computing units have to be provided in the immediate vicinity of the sensors. As an alternative, however, computing tasks, such as the evaluation of sensors, may be performed in decentralized computing units, such as microcontrollers, processors and/or the like. Preferably the sensors and/or the decentralized computing units are connected to the control unit via a safe bus system, such as, for example, fail safe over EtherCat (FSoE), SafetyBUS p, CANopen-Safety, CIP Safety, PROFIsafe or the like.

The end effector is preferably operated electrically, pneumatically or hydraulically and is configured preferably for processing, grasping, measuring and/or transporting an object. In particular, conventional end effectors may be used in HRC systems by providing two different modes of operation without having to modify said end effector for use in the HRC system. Thus, in particular, the spectrum of available end effectors that are suitable for HRC is significantly increased.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
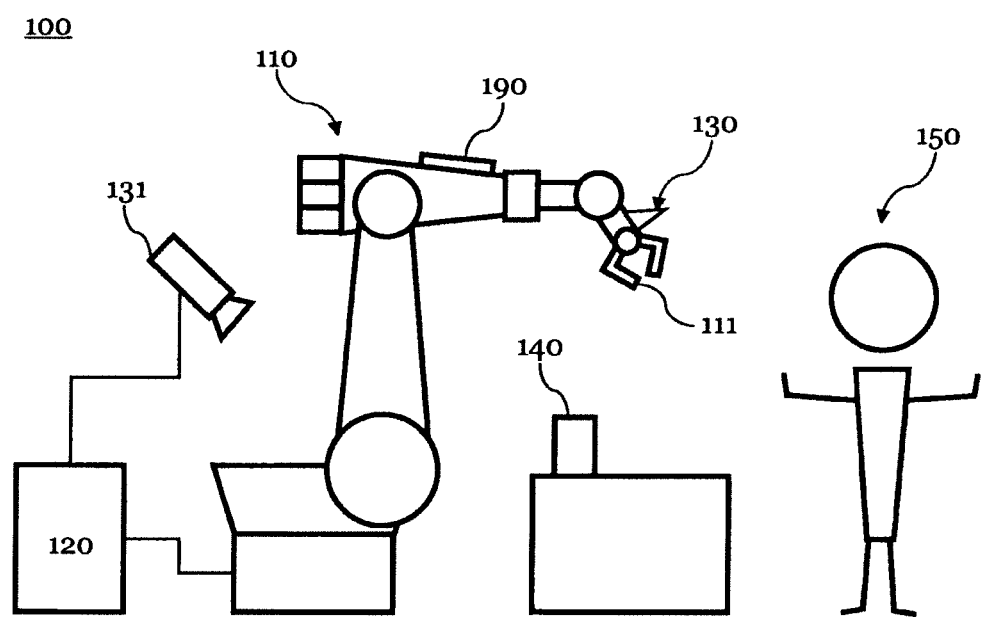
FIG. 1 is a schematic representation of an HRC system.

FIG. 1 shows an HRC system 100 comprising a manipulator 110, which is designed as an industrial robot having at least three freely programmable axes of motion. The manipulator 110 bears an end effector 111, which is a gripper in the illustration of FIG. 1. The gripper 111 is configured to grasp or to manipulate objects 140. In particular, the manipulator 110 is an HRC-suitable manipulator, so that a collaboration between manipulator 110 and human 150 is made possible.

For example, the manipulator 110 may be configured to grasp and transport the object 140 by means of the end effector 111. In the HRC system the human 150 may take over, for example, the task of performing the fine positioning of the gripped object 140, so that the assembly steps are properly executed; or the human may perform, next to the robot, preferably associated work elsewhere.

The end effector 111 may be provided, in particular, with one sensor 130 or multiple sensors 130, which enable detection of a human and/or an object or a workpiece. These sensors 130 may be, for example, capacitive, inductive, resistive or thermal sensors. Similarly it is possible to attach a sensor that can monitor the gripping force or a torque or can monitor, for example, a motor current or a pressure level. Furthermore, a sensor can monitor the positioning of the gripping elements with respect to one another. Furthermore, an optical and/or acoustic sensor 131 may be provided that detects whether and/or which component is being manipulated by the end effector 111. This optical and/or acoustic sensor 131 may comprise, for example, cameras or ultrasonic sensors and may be mounted in the vicinity of the manipulator 110, in the vicinity of the preferred gripping position or on the manipulator 110. Preferably the evaluation of the sensor 130 and/or the sensors 130, 131 is carried out by means of a control unit 120, which is configured to control the HRC system 100. Similarly the sensor 130 and/or the sensor 131 may be evaluated in at least one decentralized computing unit, which is mounted in the immediate vicinity of the sensors 130, 131 or on the manipulator 110. This arrangement enables, for example, an autonomous closed-loop control of the end effector 111.

Figure 2:
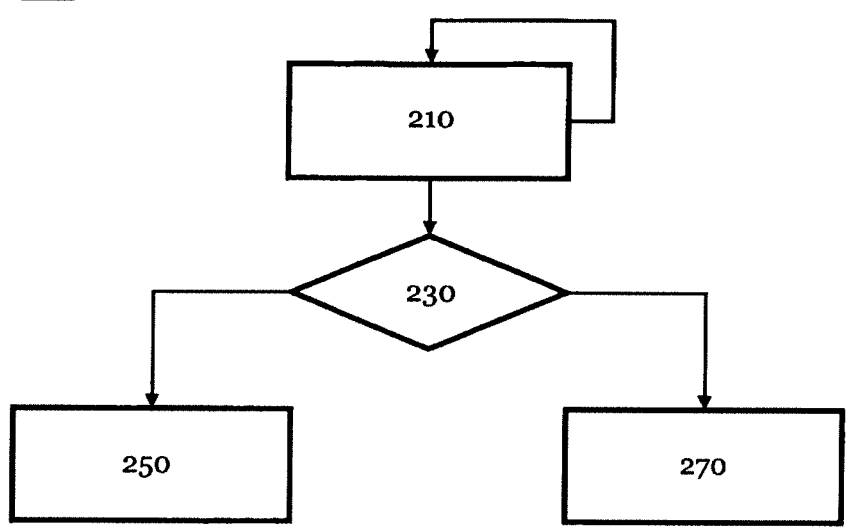
FIG. 2 is a schematic flow diagram of a method for controlling an HRC system.

FIG. 2 shows a schematic representation of a method 200 for controlling an HRC system. In a first step 210 of the method 200 an end effector, such as, for example, the gripper 111, is used in a first operating mode, wherein said first operating mode is characterized by the feature that the end effector is operated with a reduced power. As a result, the maximum gripping force of the gripper is, for example, limited; or rather the force, with which the gripping jaws are moved relative to one another, is limited. In step 230 of the method it is monitored whether a desired object is being manipulated/gripped. Similarly when the end effector 210 is used, it can also be monitored whether an upper threshold value of the first operating mode is exceeded. This monitoring is carried out preferably by means of sensors that monitor, for example, a gripping force, a motor current or generally the energy, supplied to the end effector, or the energy, converted by the end effector, and/or the power, with which the end effector is operated.

If it is determined in step 230 that no desired object is being manipulated/gripped and a human is at risk, then in step 270 of the method, the energy, supplied to the end effector 111, is shut off, in order to prevent a risk and/or an injury to a human, or to limit said risk and/or injury to a minimum. The monitoring 230, whether a desired object is being manipulated/grasped, is carried out preferably by means of thermal, resistive, capacitive, inductive, acoustic position and/or optical sensors 130, 131. If the monitoring 230 indicates that a desired object is being manipulated/gripped or no human is at risk, then in step 250 it is possible to switch to a second operating mode, in which the power, with which the end effector 111 is operated, is increased.

Figure 3:
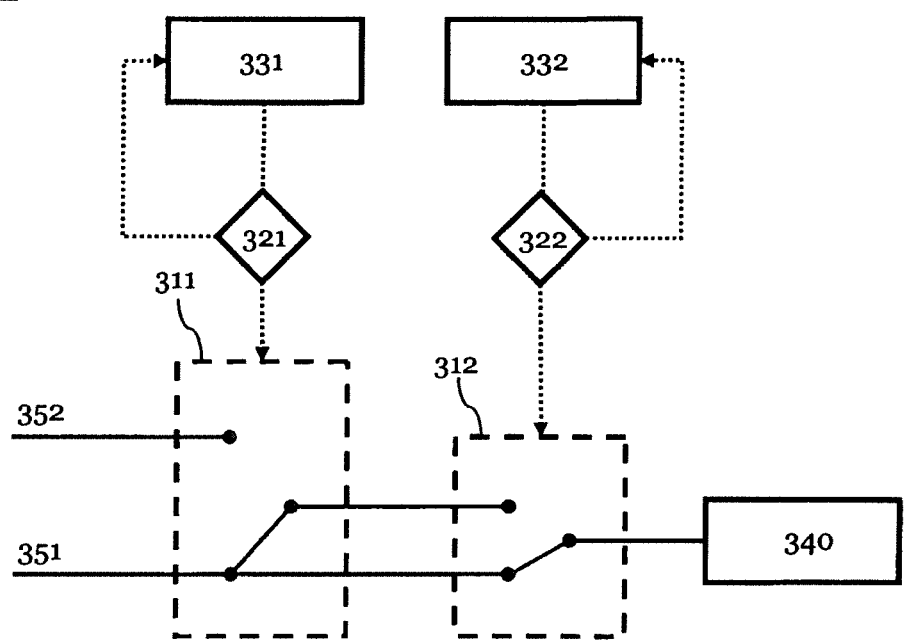
FIG. 3 is a schematic representation of an apparatus for monitoring, whether a desired workpiece is being manipulated, and for increasing the power, with which the end effector is operated.

FIG. 3 shows a schematic representation of an apparatus 300 for controlling an HRC system, wherein the power 351, 352, with which the end effector 340 is operated, can be switched from a first reduced power 351 to a second increased power 352. For this purpose the control elements 311, 312 are provided that are, for example, switches or valves. The control elements 311, 312 permit safe switching from the first operating state, in which the end effector 340 is operated with reduced power 351, to a second operating state. In the second operating state the end effector 340 is operated with increased power 352.

For example, the power 351, 352 can be provided in the form of electric current of varying current strength, pressure, such as hydraulic and/or pneumatic pressure, or the like. The control elements 311, 312 are engaged in each case, when an associated sensor 331, 332 detects that a desired object is being manipulated. By providing two sensors 331, 332, which generate a redundancy, and by means of the series connection of the means 311, 312, the change-over into the second operating state does not take place until both sensors 331, 332 detect that a desired object is being manipulated. Furthermore, the sensors 331, 332 may be preferably redundant sensors.

The sensor signals of the sensors 331, 332 are monitored cyclically and are evaluated in at least one computing unit 321, 322, which may be integrated in a control unit 120 of the HRC system 100 or may be formed separately. If the sensors 331, 332 detect that a desired object is being manipulated, then a switching signal is sent to the control elements 311, 312; and said switching signal specifies switching from the reduced power 351 to the increased power 352. If, however, no desired object is being manipulated and a human is at risk, then no switching signal is sent to the control elements 311, 312, and the monitoring is continued until a desired object is being manipulated and the risk is no longer present.

Figure 4:
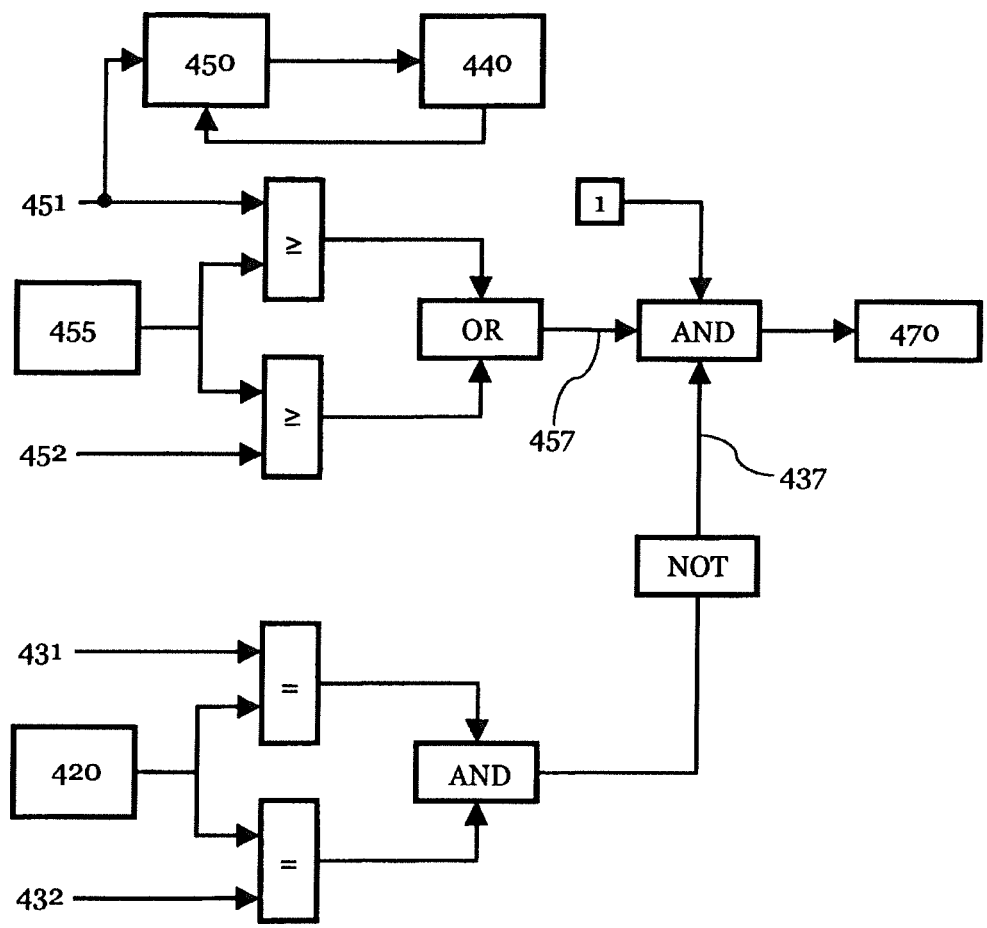
FIG. 4 is an additional schematic representation of an apparatus for controlling the HRC system.

The power 351, 352, with which the end effector 340 is operated, is preferably unregulated and is limited by an upper threshold value. For example, a first (reduced) motor current or a reduced pressure (for example, in the form of air pressure or oil pressure) may be supplied to the end effector 340 in a first operating state. If a desired object is being manipulated, then the motor current/pressure is increased to a second value 252. The reduced power 351 is selected preferably in such a way that no risk to a human is produced by means of the end effector 340. Consequently there is no need to monitor which power or force is acting when gripping and could be transferred to a human, since only a limited reduced power or force is permitted in the first operating mode. FIG. 4 shows an additional schematic representation of an apparatus 400 for controlling an HRC system. An end effector or a drive of an end effector 440 is controlled by a regulator 450. The closed-loop control may be, for example, a closed-loop force control, a closed-loop position control, a closed-loop current control, a closed-loop pressure control and/or the like. In order to simplify the description, a closed-loop current control is assumed in the following.

In a first, upper block, the motor current 451, 452 is monitored and compared against an upper threshold value 455 in a redundant manner. The upper threshold value limits the reduced power, with which the end effector is operated in the first operating mode. If a comparator detects (marked by "≥") that the threshold value 455 has been exceeded, then, for example, a logic "1" is outputted. The outputs of the redundant comparators are linked by means of an "OR" operation. If a comparator reports that the threshold value 455 has been exceeded, then the system assumes that the threshold value 455 has been exceeded, and a threshold signal 457 is outputted.

For example, the end effector 440 may be a gripper, which is operated electrically. The maximum gripping force of the gripper is limited by an upper threshold value 455, i.e., by the power, with which the gripper is operated. For example, the upper threshold value is a motor current. If this threshold value 455 is exceeded by the motor current 451, 452, which is monitored in a redundant manner, then this is detected and compared with the monitoring signal 437, which is generated in the lower block.

This monitoring signal 437 is generated by means of the sensor signals 431, 432. For example, the sensor signals 431, 432 are derived by means of capacitive, inductive, resistive, position and/or thermal sensors, as well as by means of acoustic and/or optical sensors or a combination thereof. These sensor signals 431, 432 are compared against a reference value 420. For example, the reference value 420 indicates that a desired object is being manipulated, i.e., preferably no human is at risk. If both sensor signals 431, 432 indicate that a desired object is being manipulated, i.e., preferably no human is at risk, then a logic "1" is outputted by an "AND" operation. If, however, at least one sensor signal 431, 432 indicates that no desired object is being manipulated, i.e., a potential risk is present, then a logic "0" is outputted. This output is inverted in the "NOT" block, so that the monitoring signal 437 outputs a logic "1", when at least one of the sensor signals 431, 432 indicates a potential risk. If the threshold signal 457 indicates that the threshold value 455 has been exceeded (logic "1") and that the monitoring signal 437 indicates that no desired object is being manipulated, i.e., a potential hazard exists (logic "1"), then the process continues with block 470, and the energy, supplied to the end effector, is switched off or, more specifically, is switched to the second operating state. In particular, the redundant monitoring of the upper threshold value 455, which is, for example, a motor current, eliminates the need for a redundant closed-loop control of the end effector 440. Consequently only one regulator is required. If, however, the monitoring signal 437 indicates that a desired object is being manipulated (logic "0"), then the second operating mode is engaged; and the power, supplied to the end effector, is increased.

Figure 5:
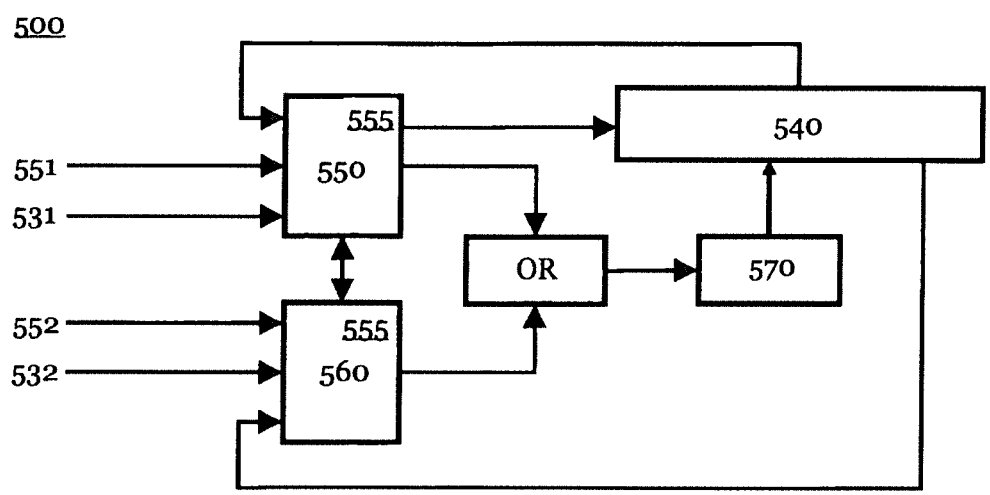
FIG. 5 is another schematic representation of an apparatus for controlling the HRC system.

FIG. 5 shows another schematic representation of an additional apparatus 500 for controlling an HRC system, wherein two regulators 550, 560 are used to control the end effector 540. In the example the end effector 540 is operated electrically. Other embodiments are possible. The motor position of the end effector 540 is fed back to the regulators 550, 560 in order to control the end effector. Furthermore, the power 551, 552, with which the end effector 540 is operated, is monitored and compared with an upper threshold value 555. This is done by means of the regulators 550, 560 in a redundant manner. Similarly the regulators 550, 560 are fed the sensor signals 531, 532, which allow the monitoring, whether a desired object is being manipulated. By means of the regulators 550, 560 the compliance with the threshold value 555, and the monitoring, whether a desired object is being manipulated, are monitored by means of the sensor signals 531, 532 in a redundant manner. The output of the regulators is compared via an "OR" block. If one of the regulators or both regulators 550, 560 indicate that the threshold value 555 has been exceeded, and no desired object is being manipulated (or a human is at risk), then the energy, supplied to the end effector 540, is switched off in step 570. If a desired object is being manipulated, then the energy, supplied to the end effector, can be increased.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS

100 HRC system
110 manipulator
111 end effector
120 control unit
130, 131 sensor
140 object
150 human
190 control element
200 method
210 use of the end effector in the first operating mode
230 monitoring, whether a desired object is being manipulated
250 increasing the power, with which the end effector is operated
270 switching off the energy, supplied to the end effector
300 schematic representation of an apparatus for controlling an HRC system
311, 312 control elements
321, 322 computing unit
331, 332 sensors
340 end effector
351, 352 power, with which the end effector is operated
400 schematic representation of an apparatus for controlling an HRC system
420 reference value
431, 432 sensor signal
437 monitoring signal
440 end effector
450 regulator
451, 452 power, with which the end effector is operated
455 upper threshold value
457 threshold signal
470 switching off the energy, supplied to the end effector
500 schematic representation of an apparatus for controlling an HRC system
531, 532 sensor signal
540 end effector
550, 560 regulator
551, 552 power, with which the end effector is operated
555 upper threshold value
570 switching off the energy, supplied to the end effector

What is claimed is:

1. A method for controlling a human-robot-collaboration (HRC) system, wherein the HRC system includes at least one robotic manipulator having an end effector, the method comprising:
   operating the end effector in a first operating mode at a first power;

monitoring to determine whether a desired object is being manipulated when the end effector is operated in the first operating mode; and operating the end effector in a second operating mode at a second power in response to a determination that the desired object is being manipulated, wherein the second power is increased relative to the first power.

2. The method of claim 1, wherein the first power with which the end effector is operated in the first operating mode is limited by an upper threshold value, the method further comprising at least one of monitoring or ensuring compliance with the upper threshold value.

3. The method of claim 2, wherein the upper threshold value defines at least one of a current, a pressure, a force, or a torque.

4. The method of claim 2, wherein the upper threshold value is set such that humans are not at risk when the end effector is operating in the first operating mode.

5. The method of claim 1, wherein monitoring to determine whether a desired object is being manipulated is carried out in accordance with safety standards.

6. The method of claim 5, wherein the monitoring is carried out using at least two sensors.

7. The method of claim 1, wherein monitoring to determine whether a desired object is being manipulated is carried out by at least one sensor, wherein the at least one sensor is at least one of:
- a capacitive sensor;
- an inductive sensor;
- a resistive sensor; or
- a thermal sensor.

8. The method of claim 7, wherein the at least one sensor is arranged on the end effector.

9. The method of claim 1, wherein monitoring to determine whether a desired object is being manipulated is carried out by at least one sensor, the at least one sensor configured to detect at least one of:
- whether an object is being manipulated, or
- which object is being manipulated, when the end effector is operated; and
- wherein the at least one sensor is at least one of an optical sensor or and acoustic sensor.

10. The method of claim 1, wherein monitoring to determine whether a desired object is being manipulated is carried out by at least two different sensors.

11. The method of claim 1, wherein monitoring to determine whether a desired object is being manipulated comprises at least one of:
- time-dependent monitoring in the first operating mode; or
- location-dependent monitoring in the first operating mode.

12. The method of claim 2, further comprising:
driving the end effector with at least one electric motor;
monitoring a motor current of the at least one electric motor; and
comparing the monitored motor current with the upper threshold value;
wherein the upper threshold value defines a maximum motor current.

13. The method of claim 12, wherein monitoring the motor current is carried out in a redundant manner.

14. The method of claim 12, further comprising controlling the motor current by at least one regulator using closed-loop control.

15. The method of claim 14, wherein the closed-loop control is carried out without safety compliance.

16. The method of claim 1, wherein the end effector is operated at least one of electrically, hydraulically, or pneumatically.

17. The method of claim 1, wherein the end effector is a gripper and the method further comprises:
in the first operating mode, grasping an object with the gripper using a first force; and
in the second operating mode, grasping the object with the gripper using a second force in response to a determination that the desired object is being grasped;
wherein the second force is greater than the first force.

18. The method of claim 17, wherein:
the gripper comprises at least two gripping elements; and
monitoring to determine whether a desired object is being manipulated is carried out by monitoring the positioning of the gripping elements relative to one another.

19. A human-robot collaboration (HRC) system, comprising:
at least one robotic manipulator on which an end effector is disposed;
a control unit configured to operate the end effector in a first operating mode at a first power;
at least one sensor configured to monitor the at least one robotic manipulator to determine whether a desired object is being manipulated when the end effector is operated in the first operating mode; and
a control element configured to increase the power with which the end effector operated to a second power in order to operate the end effector in a second operating mode in response to a determination that the desired object is being manipulated.

20. The HRC system of claim 19, wherein the control unit is configured to evaluate the at least one sensor.

21. The HRC system of claim 19, wherein:
the end effector is operated at least one of electrically, pneumatically, or hydraulically; and
the end effector is configured for at least one of processing, grasping, measuring, or transporting an object.

* * * * *